(12) United States Patent
Tanigawa et al.

(10) Patent No.: US 10,233,320 B2
(45) Date of Patent: Mar. 19, 2019

(54) THERMOPLASTIC RESIN COMPOSITION AND RESIN MOLDED ARTICLE

(71) Applicant: UMG ABS, LTD., Tokyo (JP)

(72) Inventors: Hiroshi Tanigawa, Ube (JP); Shigeki Hamamoto, Ube (JP); Koji Hirata, Ube (JP); Hirotoshi Saitou, Ube (JP)

(73) Assignee: UMG ABS, LTD., Tokyo (JP)

( * ) Notice: Subject to any disclaimer, the term of this patent is extended or adjusted under 35 U.S.C. 154(b) by 80 days.

(21) Appl. No.: 15/123,743

(22) PCT Filed: Mar. 17, 2015

(86) PCT No.: PCT/JP2015/057843
§ 371 (c)(1),
(2) Date: Sep. 6, 2016

(87) PCT Pub. No.: WO2015/141661
PCT Pub. Date: Sep. 24, 2015

(65) Prior Publication Data
US 2017/0015823 A1    Jan. 19, 2017

(30) Foreign Application Priority Data
Mar. 19, 2014 (JP) ............................... 2014-056706

(51) Int. Cl.
*C08L 25/12* (2006.01)
*C08J 5/00* (2006.01)
(Continued)

(52) U.S. Cl.
CPC ............... *C08L 25/12* (2013.01); *C08J 5/00* (2013.01); *C08L 51/04* (2013.01); *C08J 2325/12* (2013.01);
(Continued)

(58) Field of Classification Search
CPC .. C08L 25/12; C08L 2205/06; C08L 2207/04; C08L 51/04; C08J 5/00; C08J 2325/12; C08J 2451/04; C08K 2003/2217
(Continued)

(56) References Cited

U.S. PATENT DOCUMENTS

| 6,335,399 B1 | 1/2002 | Nishimoto et al. |
| 2010/0276289 A1 | 11/2010 | Tezuka et al. |
| 2014/0147660 A1 | 5/2014 | Miyahiro et al. |

FOREIGN PATENT DOCUMENTS

| JP | H03-66329 B2 | 10/1991 |
| JP | 08319327 A * | 12/1996 |

(Continued)

OTHER PUBLICATIONS

JP 08-319327 A, machine translation, JPO Japan Platform for Patent Information (J-PlatPat). (Year: 1996).*
(Continued)

*Primary Examiner* — Josephine L Chang
(74) *Attorney, Agent, or Firm* — Manabu Kanesaka

(57) ABSTRACT

A thermoplastic resin composition includes 18 to 44 parts by mass of a copolymer (A) and 56 to 82 parts by mass of a copolymer (B) so that the total is 100 parts by mass, and further includes 0.1 to 0.3 parts by mass of an alkaline earth metal oxide (M) with respect to 100 parts by mass of the total of the graft copolymer (A) and the copolymer (B). Graft copolymer (A) is obtained by graft copolymerization a monomer mixture (II) containing an aromatic vinyl based monomer and a vinyl cyanide based monomer in the presence of a composite rubber polymer (I). The polymer (I) is composed of a diene rubber (i) and a cross-linked acrylic acid ester polymer (ii). Copolymer (B) is obtained by
(Continued)

polymerization of a monomer mixture containing an aromatic vinyl based monomer and a vinyl cyanide based monomer.

4 Claims, 1 Drawing Sheet

(51) Int. Cl.
*C08L 51/04* (2006.01)
*C08K 3/22* (2006.01)

(52) U.S. Cl.
CPC ... *C08J 2451/04* (2013.01); *C08K 2003/2217* (2013.01); *C08L 2205/06* (2013.01); *C08L 2207/04* (2013.01)

(58) Field of Classification Search
USPC ........................................................ 524/433
See application file for complete search history.

(56) References Cited

FOREIGN PATENT DOCUMENTS

| JP | 11060857 A | * | 3/1999 |
| JP | 2001-040170 A | | 2/2001 |
| JP | 2001-207011 A | | 7/2001 |
| JP | 2002-069308 A | | 3/2002 |
| JP | 2006-016468 A | | 1/2006 |
| JP | 2013-209624 A | | 2/2013 |
| WO | 2009/084640 A1 | | 7/2009 |

OTHER PUBLICATIONS

JP 11-060857 A, machine translation, JPO Japan Platform for Patent Information (J-PlatPat). (Year: 1999).*

PCT/ISA/210, "International Search Report for International Application No. PCT/JP2015/057843," dated Apr. 14, 2015.

* cited by examiner

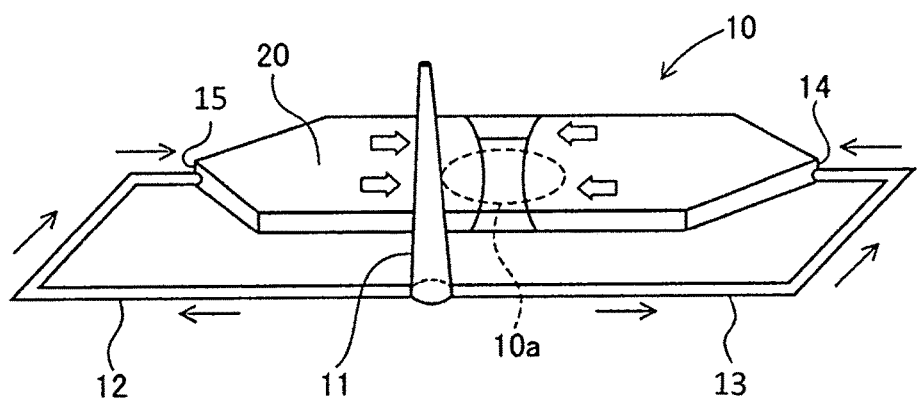

THERMOPLASTIC RESIN COMPOSITION AND RESIN MOLDED ARTICLE

RELATED APPLICATIONS

The present application is National Phase of International Application No. PCT/JP2015/057843 filed Mar. 17, 2015, and claims priority from Japanese Application No. 2014-056706, filed Mar. 19, 2014, the disclosure of which is hereby incorporated by reference herein in its entirety.

FIELD OF INVENTION

The present invention relates to a thermoplastic resin composition. In more particular, the present invention relates to a thermoplastic resin composition excellent in continuous moldability and improvability of a molded-article appearance. The present invention also relates to a resin molded article obtained by molding the thermoplastic resin composition.

BACKGROUND OF INVENTION

An ABS resin and a high impact polystyrene resin, in each of which a rubber component is blended in a resin composition, have been provided as an impact resistant resin. Since a diene polymer used as a rubber component which imparts the impact resistance has many chemically unstable double bonds in its main chain, the resins are liable to be degraded by ultraviolet rays or the like, and are inferior in weather resistance generally.

An ASA resin has been proposed as a resin that has better weather resistance than an ABS resin. An ASA resin can be obtained by graft copolymerization between an acrylonitrile compound and a styrene compound in the presence of an acrylic rubber having no double bonds. Since acrylic rubber is contained in ASA resin, an ASA resin is excellent in weather resistance but has shortcomings of low impact resistance.

A method for increasing a swelling ratio of acrylic rubber has been conducted in some cases for improving an impact resistance of an ASA resin. In this case, a surface glossiness of a resin molded article is seriously degraded. When an impact resistance is improved by increasing molecular weight of a resin, excellent moldability which is the feature of an ASA resin is degraded.

In order to obtain a high level of balance with the weather resistance and furthermore with the surface smoothness and the moldability, Japanese Patent Publication H3-66329B has proposed a specific ASA resin containing rubber obtained by compounding a small amount of conjugated diene rubber and a large amount of acrylic acid ester rubber. When continuous molding is performed using this specific ASA resin, a gas generated during molding is deposited on a mold to form an oily material, and a deposit thereof is transferred to a molded article side, so that an appearance thereof is degraded. Hence, the oily deposit adhered to the mold is required to be periodically removed by cleaning, and hence continuous moldability becomes inferior. Even when an amount of the gas thus generated is small, appearance defects, such as a flow mark and a silver streak, are generated.

Patent Literature 1: Japanese Patent Publication H3-66329B

SUMMARY OF INVENTION

The present invention provides a thermoplastic resin composition that is excellent in continuous moldability and improvability of molded-article appearance and a resin molded article obtained by molding the thermoplastic resin composition.

The present inventors found that the following thermoplastic resin composition solves problems described above, the thermoplastic resin being obtained in such a way that a graft copolymer obtained in the presence of a specific composite rubber polymer, by polymerization of a monomer mixture containing an aromatic vinyl based monomer and a vinyl cyanide based monomer and a copolymer obtained by polymerization of a monomer mixture containing an aromatic vinyl based monomer and a vinyl cyanide based monomer are blended together at a predetermined rate, and in addition, a predetermined amount of an alkaline earth metal oxide is added.

The present invention is as described below.

[1] A thermoplastic resin composition comprising 18 to 44 parts by mass of a copolymer (A) and 56 to 82 parts by mass of a copolymer (B) so that the total thereof is 100 parts by mass, and further comprising 0.1 to 0.3 parts by mass of an alkaline earth metal oxide (M) with respect to 100 parts by mass of the total of the graft copolymer (A) and the copolymer (B).

Graft copolymer (A): a graft copolymer obtained by graft copolymerization of 35 to 65 parts by mass of a monomer mixture (II) containing 60 to 95 percent by mass of an aromatic vinyl based monomer and 5 to 40 percent by mass of a vinyl cyanide based monomer in the presence of 35 to 65 parts by mass of a composite rubber polymer (I), the polymer (I) being composed of 5 to 90 percent by mass of a diene rubber (i) and 95 to 10 percent by mass of a cross-linked acrylic acid ester polymer (ii), the rubber (i) being obtained by using a small particulate diene rubber and an acid group-containing copolymer, the polymer (I) having a mass average particle diameter of 180 to 500 nm, and the total of the composite rubber polymer (I) and the monomer mixture (II) being 100 parts by mass; and Copolymer (B): a copolymer obtained by polymerization of a monomer mixture containing 60 to 95 percent by mass of an aromatic vinyl based monomer and 5 to 40 percent by mass of a vinyl cyanide based monomer.

[2] The thermoplastic resin composition according to [1], wherein the composite rubber polymer (I) is a polymer obtained by polymerization of a monomer including an acrylic acid ester in the presence of the diene rubber (i), the acrylic acid ester forming the cross-linked acrylic acid ester polymer (ii).

[3] The thermoplastic resin composition according to [1] or [2], wherein a toluene soluble component of the diene rubber (i) has a polystyrene-based mass average molecular weight of 100,000 or more.

[4] A resin molded article formed by molding the thermoplastic resin composition according to any one of [1] to [3].

Advantageous Effects of Invention

The present invention reduces mold contamination caused by generated gas, and also reduces inferior appearance of a molded article such as a flow mark or a silver streak, even when continuous molding is performed. A molded resin article having an excellent appearance can be produced by the present invention. The present invention provides a thermoplastic resin composition and a molded article thereof that is excellent in continuous moldability and improvability of an appearance of a molded article.

The thermoplastic resin composition of the present invention contains the graft copolymer (A) and the copolymer (B). The graft copolymer (A) is obtained by graft copolymerization of the monomer mixture (II) containing an aromatic vinyl based monomer and a vinyl cyanide based monomer in the presence of the composite rubber polymer (I) formed of predetermined amounts of the diene rubber (i) and the cross-linked acrylic acid ester polymer (ii). The thermoplastic resin composition is excellent in impact resistance and weather resistance and can be preferably used for applications each required to have an impact resistance and a weather resistance, such as a vehicle interior, a vehicle exterior, and a building material and also, such as mobile apparatuses which is frequently carried out of a building (a notebook type personal computer, a tablet type personal computer, a mobile phone including a smart phone, a digital camera, a digital video camera, and the like). When the thermoplastic resin composition of the present invention is molded, an excellent continuous moldability can be obtained.

The molded article of the thermoplastic resin composition of the present invention has an excellent appearance.

BRIEF DESCRIPTION OF DRAWINGS

FIG. 1 is a schematic view sowing a mold used for a gas generation/adhesion test performed in examples.

DESCRIPTION OF EMBODIMENTS

Hereinafter, embodiments of the present invention will be described in detail.

[Thermoplastic Resin Composition]

The thermoplastic resin composition of the present invention contains 18 to 44 parts by mass of the following graft copolymer (A) and 56 to 82 parts by mass of the following copolymer (B) so that the total thereof is 100 parts by mass and further contains 0.1 to 0.3 parts by mass of an alkaline earth metal oxide (M) with respect to 100 parts by mass of the total of the graft copolymer (A) and the copolymer (B).

The graft copolymer (A) is a graft copolymer obtained by graft copolymerization of 35 to 65 parts by mass of a monomer mixture (II) containing 60 to 95 percent by mass of an aromatic vinyl based monomer and 5 to 40 percent by mass of a vinyl cyanide based monomer in the presence of 35 to 65 parts by mass of a composite rubber polymer (I). The polymer (I) is composed of 5 to 90 percent by mass of a diene rubber (i) and 95 to 10 percent by mass of a cross-linked acrylic acid ester polymer (ii). The rubber (i) is obtained by using a small particulate diene rubber and an acid group-containing copolymer. The polymer (I) has a mass average particle diameter of 180 to 500 nm. The total of the composite rubber polymer (I) and the monomer mixture (II) is 100 parts by mass.

The copolymer (B) is a copolymer obtained by polymerization of a monomer mixture containing 60 to 95 percent by mass of an aromatic vinyl based monomer and 5 to 40 percent by mass of a vinyl cyanide based monomer.

<Graft Copolymer (A)>

The graft copolymer (A) of the present invention is obtained by graft copolymerization of the monomer mixture (II) in the presence of the composite rubber polymer (I). The mixture (II) contains an aromatic vinyl based monomer and a vinyl cyanide based monomer together with, if needed, a different monomer copolymerizable therewith. The polymer (I) is composed of the diene rubber (i) and the cross-linked acrylic acid ester polymer (ii).

As the diene rubber (i) forming the composite rubber polymer (I), there may be mentioned a polybutadiene; a conjugated diene polymer such as a copolymer of butadiene and a vinyl monomer copolymerizable therewith; a butadiene-aromatic vinyl copolymer such as a butadiene-vinyltoluene copolymer; a butadiene-cyanide vinyl copolymer, such as a butadiene-acrylonitrile copolymer or a butadiene-methacrylonitrile copolymer; a butadiene-alkyl acrylate copolymer, such as a butadiene-methyl acrylate copolymer, a butadiene-ethyl acrylate copolymer, or a butadiene-2-ethylhexyal acrylate copolymer; or a butadiene-alkyl methacrylate copolymer, such as a butadiene-methyl methacrylate copolymer or a butadiene-ethyl methacrylate copolymer. Those compounds mentioned above may be used alone, or at least two types thereof may be used by mixing.

A catalyst and an emulsifier to be used for manufacturing of the diene rubber (i) are not particularly limited, and any materials which have been known may be preferably used.

The mass average particle diameter of the diene rubber (i) is adjusted to preferably 150 nm to 1 μm, more preferably 200 to 500 nm, and particularly preferably 240 to 390 nm in view of the impact resistance and the appearance of a molded article to be obtained. The distribution of the diameters of dispersion particles of the diene rubber (i) is not particularly limited, and at least two types of rubbers having different dispersion particle diameters may be used in combination. In addition, the mass average particle diameter of the diene rubber (i) and that of the acid group-containing copolymer which will be described below are measured and calculated by a method shown in the example to be described later.

In order to adjust the particle diameter of the diene rubber (i), known methods may be used. For example, there may be used a method in which by agglomeration of a diene rubber in polymerization, enlargement is performed; a method in which a relatively small diene rubber (small particulate diene rubber) having a mass average particle diameter of less than 150 nm, such as 65 to 85 nm, is manufactured in advance, and enlargement is performed by addition of a copolymer (acid group-containing copolymer) latex containing an acid group, an acid, a salt, or the like to the above diene rubber; or a method in which enlargement is performed using a shearing stress generated by stirring.

In the present invention, the diene rubber (i) is manufactured using a latex of the small particulate diene rubber and the acid group-containing copolymer latex described above.

The acid group-containing copolymer latex is a latex of an acid group-containing copolymer obtained by polymerization in water of a monomer mixture (the total of monomers is 100 percent by mass) containing 5 to 30 percent by mass of an acid group-containing monomer and 95 to 70 percent by mass of an unsaturated carboxylic acid ester monomer with, if needed, 0 to 25 percent by mass of a different monomer copolymerizable therewith.

As the acid group-containing monomer, an unsaturated compound having a carboxyl group is preferable. As the unsaturated compound having a carboxyl group, for example, (meth)acrylic acid, itaconic acid, or crotonic acid may be mentioned, and (meth)acrylic acid is particularly preferable. Those acid group-containing monomers may be used alone, or at least two types thereof may be used in combination.

As the unsaturated carboxylic acid ester monomer, an alkyl (meth)acrylate is preferable, and an alkyl (meth)acrylate having an alkyl group of 1 to 12 carbon atoms is more preferable.

As the alkyl (meth)acrylate, an ester of acrylic acid or methacrylic acid and an alcohol having a linear or a branched alkyl group of 1 to 12 carbon atoms may be mentioned. As the alkyl (meth)acrylate, for example, there may be mentioned methyl acrylate, ethyl acrylate, propyl acrylate, n-butyl acrylate, isobutyl acrylate, t-butyl acrylate, 2-ethylhexyl acrylate, methyl methacrylate, ethyl methacrylate, propyl methacrylate, n-butyl methacrylate, isobutyl methacrylate, t-butyl methacrylate, or 2-ethylhexyl methacrylate. The alkyl (meth)acrylate preferably has an alkyl group of 1 to 8 carbon atoms.

Those unsaturated carboxylic acid ester monomers may be used alone, or at least two types thereof may be used in combination.

The different monomer is a monomer copolymerizable with an acid group-containing monomer and an unsaturated carboxylic acid ester monomer and is a monomer other than an acid group-containing monomer and an unsaturated carboxylic acid ester monomer.

As the different monomer, for example, there may be mentioned an aromatic vinyl based monomer, such as styrene, α-methylstyrene, or p-methylstyrene; an unsaturated nitrile monomer, such as acrylonitrile or methacrylonitrile; or a compound having at least two polymerizable functional groups, such as allyl methacrylate, polyethylene glycol dimethacrylate, triallyl cyanurate, triallyl isocyanurate, or triallyl trimellitate. Those different monomers may be used alone, or at least two types thereof may be used in combination.

A ratio of the acid group-containing monomer is in general, 5 to 30 percent by mass in the monomer mixture (100 percent by mass) to be used for manufacturing of the acid group-containing copolymer and is preferably 8 to 25 percent by mass. When the ratio of the acid group-containing monomer is 5 percent by mass or more, the small particulate diene rubber can be sufficiently enlarged. When the ratio of the acid group-containing monomer is 30 percent by mass or less, during manufacturing of the acid group-containing copolymer latex, the generation of agglomerates can be suppressed.

A ratio of the unsaturated carboxylic acid ester monomer is in general, 70 to 95 percent by mass in the monomer mixture (100 percent by mass) and is preferably 75 to 92 percent by mass.

A ratio of the different monomer is in general, 0 to 25 percent by mass in the monomer mixture (100 percent by mass) and is preferably 0 to 20 percent by mass.

The acid group-containing copolymer latex is preferably manufactured by emulsion polymerization.

As an emulsifier used for the emulsion polymerization, for example, an anionic emulsifier may be mentioned.

As the anionic emulsifier, for example, there may be mentioned an carboxylic acid salt, such as an alkali metal salt of a fatty acid, e.g., oleic acid, palmitic acid, stearic acid, or rosin acid, or an alkali metal salt of an alkenyl succinate; an alkyl sulfonate ester, a sodium alkylbenzene sulfonate, a sodium alkyl sulfosuccinate, or a sodium polyoxyethylene nonyl phenyl ether sulfonate.

Those emulsifiers may be used alone, or at least two types thereof may be used in combination.

The total amount of the emulsifier may be simultaneously charged at the beginning of polymerization, or after the emulsifier is partially charged at the beginning of polymerization, the rest thereof may be charged intermittently or continuously during the polymerization.

By the amount of the emulsifier and the charge method thereof, the mass average particle diameter of the acid group-containing copolymer and, furthermore, the mass average particle diameter of an enlarged diene rubber (i) can be adjusted.

As a polymerization initiator used for the emulsion polymerization, for example, a thermal decomposition type initiator or a redox type initiator may be mentioned. As the thermal decomposition type initiator, for example, potassium persulfate, sodium persulfate, or ammonium persulfate may be mentioned. As the redox type initiator, for example, a combination of an organic peroxide, such as cumene hydroperoxide, sodium formaldehyde sulfoxylate, and an iron salt may be mentioned.

Those polymerization initiators may be used alone, or at least two types thereof may be used in combination.

In the emulsion polymerization, a chain transfer agent adjusting the molecular weight, an alkali or an acid adjusting the pH, and an electrolyte functioning as a viscosity reducing agent may also be used. As the chain transfer agent, for example, there may be used a mercaptan, such as t-dodecyl mercaptan or n-octyl mercaptan, terpinolene, or α-methylstyrene dimmer.

The mass average particle diameter of the acid group-containing copolymer contained in the acid group-containing copolymer latex is preferably 200 nm or less and more preferably 150 nm or less. When the mass average particle diameter of the acid group-containing copolymer is large, the stability of the acid group-containing copolymer latex tends to be degraded; however, when the mass average particle diameter of the acid group-containing copolymer is 200 nm or less, while the generation of agglomerates is suppressed, the acid group-containing copolymer can be manufactured.

As the amount of the acid group-containing copolymer latex to be used when enlargement is performed by mixing the small particulate diene rubber latex and the acid group-containing copolymer latex, the solid component of the acid group-containing copolymer latex is with respect to 100 parts by mass of the solid component of the small particulate diene rubber latex, preferably 0.1 to 10 parts by mass and more preferably 0.3 to 7 parts by mass. When the amount of the solid component of the acid group-containing copolymer latex is 0.1 parts by mass or more, the enlargement of the small particulate diene rubber is sufficiently advanced, and an enlarged diene rubber (i) having a desired mass average particle diameter is likely to be obtained, and in addition, the generation of agglomerates can also be suppressed. When the amount of the solid component of the acid group-containing copolymer latex is 10 parts by mass or less, the decrease in pH of the latex can be suppressed, and the latex is stabilized.

The stirring performed for the enlargement is required to be appropriately controlled. When the stirring is sufficient, since the enlargement is uniformly advanced, the residue of un-enlarged rubber polymer is reduced, and an enlarged diene rubber (i) having a desired mass average particle diameter is likely to be obtained. In addition, when the stirring is excessively performed, the latex becomes unstable, and a large amount of agglomerates may be generated in some cases.

The temperature at which the enlargement is performed is preferably 10° C. to 90° C. and more preferably 20° C. to 80° C. When the temperature is 10° C. to 90° C., the enlargement of the small particulate diene rubber is sufficiently advanced, and an enlarged diene rubber (i) having a desired mass average particle diameter is likely to be obtained.

The cross-linked acrylic acid ester polymer (ii) forming the composite rubber polymer (I) is formed of an acrylic acid ester as a primary component and, if needed, a monomer copolymerizable therewith. As this acrylic acid ester, for example, there may be used an alkyl ester having 1 to 12 carbon atoms in which the ester portion is methyl, ethyl, n-propyl, n-butyl, 2-ethylhexyl, n-lauryl, or the like; a haloalkyl ester such as acrylic acid chloro ester; or an aryl ester or an aryl alkyl ester, such as benzyl acrylate or a phenethyl acrylate.

As the monomer copolymerizable with an acrylic acid ester, for example, there may be mentioned a methacrylic acid ester, such as methyl methacrylate or butyl methacrylate, acrylonitrile, or styrene. The monomer copolymerizable with an acrylic acid ester is used upon request in a range of 50 percent by mass or less in the cross-linked acrylic acid ester polymer (ii).

In order to form a cross-linked structure in an acrylic acid ester polymer, in general, a monomer or a monomer mixture containing the above acrylic acid ester as a primary component is polymerized by addition of a graft crossing agent or a cross linking agent. When the cross-linked structure is formed in the acrylic acid ester polymer, a graft crossing agent and a cross linking agent are preferably used in combination.

As the graft crossing agent, for example, an allyl ester of acrylic acid, methacrylic acid, maleic acid, fumaric acid, cyanuric acid, isocyanuric acid, or the like may be mentioned. As the cross linking agent, a compound having at least two unsaturated aliphatic group portions in its molecule, such as diacrylate or dimethacrylate of an alkylene glycol or divinylbenzene, may be mentioned. The total use amount of the graft crossing agent and the cross linking agent is in the acrylic acid ester monomer (100 percent by mass), preferably 0.1 to 5 percent by mass, more preferably 0.2 to 3 percent by mass, and further preferably 0.5 to 2 percent by mass.

The composite rubber polymer (I) can be obtained in the presence of 5 to 90 percent by mass or preferably 10 to 50 percent by mass of the diene rubber (i), by emulsion polymerization of 95 to 10 percent by mass or preferably 90 to 50 percent by mass of a monomer or a monomer mixture forming the cross-linked acrylic acid ester polymer (ii).

In manufacturing of the composite rubber polymer (I), when the rate of the diene rubber (i) is smaller than the range described above, and the rate of the monomer or the monomer mixture forming the cross-linked acrylic acid ester polymer (ii) is larger than the above range, the impact resistance is degraded, and on the other hand, when the rate of the diene rubber (i) is larger than the range described above, and the rate of the monomer or the monomer mixture forming the cross-linked acrylic acid ester polymer (ii) is smaller than the above range, the weather resistance is degraded.

In view of the impact resistance and the appearance of the molded article to be obtained, the mass average particle diameter of the composite rubber polymer (I) is preferably in a range of 180 to 500 nm and particularly preferably in a range of 260 to 330 nm.

The graft copolymer (A) of the present invention can be obtained in the presence of the composite rubber polymer (I), by graft copolymerization of the monomer mixture (II) containing an aromatic vinyl based monomer, a vinyl cyanide based monomer, and a different monomer copolymerizable therewith.

As the composite rubber polymer (I), one type polymer may be used alone, or at least two types of polymers having different structural components and/or composition rates of the diene rubber (i) and the cross-linked acrylic acid ester polymer (ii) may also be used by mixing.

As the aromatic vinyl based monomer, styrene, methylstyrene, such as α-methylstyrene, dimethylstyrene, ethylstyrene, t-butylstyrene, or halogenated styrene may be mentioned for example. Those mentioned above may be used alone, or at least two types thereof may be used by mixing. Among those mentioned above, styrene or α-methylstyrene is preferably used.

As the vinyl cyanide based monomer, acrylonitrile, methacrylonitrile, ethacrylonitrile, maleonitrile, or fumaronitrile may be mentioned for example, and those may be used alone, or at least two types thereof may be used by mixing. Among those mentioned above, acrylonitrile is preferable.

In the monomer mixture (II), 60 to 95 percent by mass of the aromatic vinyl based monomer or preferably 70 to 85 percent by mass thereof is used, and 5 to 40 percent by mass of the vinyl cyanide based monomer or preferably 15 to 30 percent by mass thereof is used. When those compounds are used in the ranges as described above, the compatibility between the graft copolymer (A) and the copolymer (B) is improved, and the appearance defect of the molded article to be obtained is not likely to occur.

In the monomer mixture (II), in further response to the request, 0 to 40 percent by mass of the different monomer copolymerizable with the above monomer or preferably 0 to 30 percent by mass thereof may also be used. As the monomer described above, for example, there may be mentioned an unsaturated carboxylic acid compound, such as acrylic acid or methacrylic acid; an unsaturated ester compound, such as methyl methacrylate, butyl acrylate, 2-ethylhexyl methacrylate, benzyl methacrylate, glycidyl methacrylate, or vinyl acetate; an unsaturated acid anhydride such as maleic anhydride; a maleimide compound, such as N-phenyl maleimide or N-cyclohexyl maleimide; an unsaturated amide compound, such as acrylamide or methacrylamide; or an unsaturated nitrogenous base compound, such as vinyl pyridine or vinyl carbazole. Those compounds may be used alone, or at least two types thereof may be used by mixing.

The graft copolymer (A) is manufactured in the presence of a polymerization initiator, by graft copolymerization by adding the above monomer mixture (II) to the composite rubber polymer (I). A method of adding the monomer mixture (II) is not particularly limited, and for example, there may be used a method in which the total amount is collectively charged or is divided and charged at a certain time, a method in which after a part of the monomer mixture is charged at a certain time, the rest thereof is continuously added, or a method in which the total amount is continuously added. In addition, if needed, in order to stabilize the polymerization system, the graft copolymerization may be performed with a treatment, such as the addition of an emulsifier, the use of a polymerization degree adjuster, or the adjustment of pH of the polymerization system.

When the emulsifier is used in the polymerization, after solidification is performed using a known method, through the steps of washing, dehydration, and drying, the graft copolymer (A) in the form of powder can be obtained from the latex.

The graft copolymer (A) can be obtained by graft copolymerization of 35 to 65 parts by mass preferably 55 to 45 parts by mass of the monomer mixture (II) (The total of the composite rubber polymer (I) and the monomer mixture (II) is 100 parts by mass) in the presence of 35 to 65 parts by mass preferably 45 to 55 parts by mass of the composite rubber polymer (I). When the composite rubber polymer (I) is out of the range described above, the molded article may be degraded in its appearance, due to a silver streak or the like.

<Copolymer (B)>

The copolymer (B) is a copolymer obtained by polymerization of a monomer mixture formed of 60 to 95 percent by mass of an aromatic vinyl based monomer or preferably 70 to 85 percent by mass thereof, 5 to 40 percent by mass of a vinyl cyanide based monomer or preferably 15 to 30 percent by mass thereof, and 0 to 40 percent by mass of a different monomer copolymerizable therewith or preferably 0 to 30 percent by mass thereof. When the aromatic vinyl based monomer, the vinyl cyanide based monomer, and the different monomer are in the respective ranges described above, the compatibility of the graft copolymer (A) and the copolymer (B) is improved, and the appearance defect of the molded article to be obtained is not likely to occur.

As the aromatic vinyl based monomer, the vinyl cyanide based monomer, and the different monomer copolymerizable therewith, each of which is used to obtain the copolymer (B), compounds similar to those used to obtain the graft copolymer (A) may be used.

A method for manufacturing the copolymer (B) is not particularly limited, and a method, such as emulsion polymerization, suspension polymerization, solution polymerization, or bulk polymerization, may be used.

The weight average molecular weight (Mw) of the copolymer (B) is preferably in a range of 50,000 to 200,000 and more preferably in a range of 75,000 to 150,000. When the weight average molecular weight of the copolymer (B) is lower than the range described above, the impact resistance of the molded article to be obtained is insufficient, and when the weight average molecular weight is more than the range described above, the moldability is degraded. The weight average molecular weight of the copolymer (B) is measured by a method described in the following example.

<Content Rates of Graft Copolymer (A) and Copolymer (B)>

In the thermoplastic resin composition of the present invention, the content rates of the graft copolymer (A) and the copolymer (B) are 18 to 44 parts by mass and 56 to 82 parts by mass, respectively, and are preferably 25 to 35 parts by mass and 65 to 75 parts by mass, respectively (in this case, the total of the graft copolymer (A) and the copolymer (B) is 100 parts by mass). When the content rates of the graft copolymer (A) and the copolymer (B) are out of the ranges described above, problems, such as a decrease in fluidity in molding and a decrease in impact resistance of the molded article to be obtained, may arise.

In addition, as each of the graft copolymer (A) and the copolymer (B), one type may be used alone, or at least two types having different constituent components and the like may be used by mixing.

<Alkaline Earth Metal Oxide (M)>

As the alkaline earth oxide (M), for example, there may be mentioned beryllium oxide, magnesium oxide, calcium oxide, strontium oxide, or barium oxide. Those oxides may be used alone, or at least two types thereof may be used by mixing. Among those oxides mentioned above, from safety and economic point of views, magnesium oxide and calcium oxide are preferable. Magnesium oxide and calcium oxide may also be obtained from magnesium hydroxide, calcium hydroxide, magnesium carbonate, and the like.

In the thermoplastic resin composition of the present invention, the blending amount of the alkaline earth metal oxide (M) is with respect to 100 parts by mass of the total of the graft copolymer (A) and the copolymer (B), 0.1 to 0.3 parts by mass and preferably 0.2 to 0.3 parts by mass. When the blending amount of the alkaline earth metal oxide (M) is less than 0.01 parts by mass, a gas generated during molding is deposited in the form of oil on a mold, and the molded-article appearance is degraded. That is, the continuous moldability is degraded. When the blending amount of the alkaline earth metal oxide (M) is more than 0.3 parts by mass, a flow mark and/or a silver streak is generated on the molded article, so that the molded-article appearance is degraded.

<Other Components>

In the thermoplastic resin composition of the present invention, a thermoplastic resin, such as a polycarbonate, a poly(ethylene terephthalate), a poly(butylene terephthalate), or a polyamide: known various types of stabilizer, plasticizer, lubricant, metal soap, antistatic agent, dye, inorganic or organic and granular, powdery or fibrous filling agent, foaming agent, and the like may also be added besides the graft copolymer (A), the copolymer (B), and the alkaline earth metal oxide (M), if needed.

<Manufacturing and Molding of Thermoplastic Resin Composition>

The thermoplastic resin composition of the present invention is obtained by mixing and kneading the graft copolymer (A), the copolymer (B), and the alkaline earth metal oxide (M), each of which is an essential component, together with various arbitrary components to be used if needed and is used as a molding material for a resin molded article. A method for mixing and kneading those components is not particularly limited, and any general mixing/kneading method may be used. For example, a method may be mentioned in which after kneading is performed using an extruder, a banbury mixer, a heat mixing roller, or the like, pellets are formed by cutting using a pelletizer or the like.

[Resin Molded Article]

A resin molded article of the present invention is obtained by molding the thermoplastic resin composition of the present invention described above. A molding method therefor is not particularly limited at all. As the molding method, for example, there may be mentioned an injection molding method, an extrusion molding method, a compression molding method, an insert molding method, a vacuum molding method, or a blow molding method.

EXAMPLES

Hereinafter, the present invention will be described in more detail with reference to examples and comparative examples. Without departing from the scope of the present invention, the present invention is not limited to the following examples. In the following examples, "%" and "part(s)" are mass basis unless otherwise particularly noted.

In the following examples and comparative examples, measurement of various physical properties was performed by the following methods.

The weight average molecular weight (Mw) of the copolymer (B) was calculated in accordance with a standard polystyrene conversion method in which measurement was performed using a solution in which the copolymer (B) was dissolved in tetrahydrofuran as a measurement sample by GPC (gel permeation chromatography) (manufactured by Tosoh Corp.).

The mass average particle diameters of the diene rubber (i), the acid group-containing copolymer, and the composite rubber polymer (I) were each obtained in such a way that after sizes of 300 to 400 rubber particles were counted using a transmission electron microscope, the mass average particle diameter was calculated.

Synthetic Example

Synthetic Example 1

Manufacturing of Graft Copolymer (A-1)

(a) Manufacturing of Small Particulate Diene Rubber (a-1) Latex

After 145 parts of deionized water (hereinafter, simply referred to as "water"), 1.0 part of potassium rosinate, 1.0 part of potassium oleate, 0.06 parts of sodium hydroxide, 0.4 parts of sodium sulfate, and 0.3 parts of t-dodecyl mercaptan were charged into a stainless steel-made autoclave having a volume of 10 liters (hereinafter, abbreviated as "SUS-made autoclave"), and nitrogen gas substitution was then performed, 125 parts of 1,3-butadiene was charged, and the temperature was increased to 60° C.

Next, an aqueous solution in which 0.3 parts of potassium persulfate was dissolved in 5 parts of water was charged with pressure, so that polymerization was started. During the polymerization, the polymerization temperature was adjusted to 65° C., and when the inside pressure reached 4.5 kg/cm$^2$ (gauge pressure) after 12 hours passed, un-reacted 1,3-butadiene was recovered. Subsequently the inside temperature was set to 80° C. and maintained for 1 hour, so that a small particulate diene rubber (a-1) latex having a mass average particle diameter of 80 nm, a solid component of 41 percent by mass, a polymerization conversion rate of 81%, and a toluene-soluble polystyrene-based weight average molecular weight of 121,000 was obtained.

(b) Manufacturing of Acid Group-Containing Copolymer (b-1) for Rubber Enlargement After 200 parts of water, 2.0 parts of potassium oleate, 2.5 parts of sodium dioctyl sulfosuccinate, and 0.3 parts of sodium formaldehyde sulfoxylate were charged into a glass-made reactor having a volume of 5 liters, the temperature was increased to 60° C., and from this point, a mixture containing 85 parts of n-butyl acrylate, 15 parts of methacrylic acid, and 0.4 parts of cumene hydroperoxide was continuously dripped over 120 minutes. Furthermore, the aging was performed for 2 hours, so that an acid group-containing copolymer (b-1) latex having a polymerization conversion rate of 98% and a mass average particle diameter of 80 nm was obtained.

(c) Manufacturing of Enlarged Diene Rubber (i-a) Latex

While stirring was performed, 2 parts by mass of the acid group-containing copolymer (b-1) latex on the solid component basis was added to 100 parts of the small particulate diene rubber (a-1) on the solid component basis, and furthermore, stirring was performed for 30 minutes, so that an enlarged diene rubber (i-a) latex having an average particle diameter of 250 nm was obtained.

(d) Manufacturing Composite of Composite Rubber Polymerization (I-1)

After 20 parts by mass of the enlarged diene rubber (i-a) latex on the solid component basis was charged into a glass-made reactor having a volume of 5 liters, and 1.0 part of potassium rosinate and 150 parts of water were then added, nitrogen gas substitution was performed, and the inside temperature was increased to 70° C. To the mixture thus obtained, an aqueous solution in which 0.12 parts of potassium persulfate was dissolved in 10 parts of water was added, and continuously, a monomer mixture which was formed of 79.5 parts by mass of n-butyl acrylate, 0.33 parts by mass of allyl methacrylate, and 0.17 parts by mass of ethylene glycol dimethacrylate and which was nitrogen-substituted in advance was dripped over 2 hours. After the dripping was completed, the inside temperature was increased to 80° C. and maintained for 1 hour, so that a composite rubber polymer (I-1) latex was obtained which was formed of the enlarged diene rubber (i-a) and a cross-linked acrylic acid ester polymer (ii) and which had a mass average particle diameter of 270 nm.

(e) Manufacturing of Graft Copolymer (A-1)

After 50 parts of the composite rubber polymer (I-1) latex on the solid component basis was charged into a glass-made reactor, 140 parts of water were added, and the temperature was increased to 70° C. Next, a mixture in which 0.3 parts of benzoyl peroxide was dissolved in advance in 50 parts of a monomer mixture formed of 25% of acrylonitrile and 75% of styrene was nitrogen-substituted for 1 hour while stirring was performed, and this mixture was dripped over 3 hours to the composite rubber polymer (I-1) which was heated to 70° C., so that polymerization was performed.

Subsequently, after the dripping was completed, the inside temperature was increased to 80° C., and stirring was performed for 1 hour, so that a graft copolymer (A-1) in the form of latex was obtained. After a 0.4% sulfuric acid aqueous solution in a volume 2 times the volume of the latex described above was heated to 70° C. while being stirred, the latex was charged to the aqueous solution described above. Next, after the charge was completed, the temperature was increased to 95° C. and was maintained for 5 minutes, so that a slurry containing agglomerates was obtained. Subsequently, the slurry was dehydrated, washed, and dried, so that a graft copolymer (A-1) in the form of a milky white powder was obtained.

Synthetic Example 2

Manufacturing of Copolymer (B-1)

After 150 parts of water, 25 parts of acrylonitrile, 75 parts of styrene, 0.15 parts of azobisobutyronitrile, 0.3 parts of t-dodecyl mercaptan, and 0.5 parts of a poly(vinyl alcohol) were charged into a SUS-made autoclave having a volume of 10 liters and were stirred by an agitator, the dispersion state in the system was confirmed. Subsequently, the temperature was increased to 75° C., and polymerization was performed for 2 hours. Next, the inside temperature was increased to 110° C. and maintained for 25 minutes, so that the reaction was completed. After cooling was performed, dehydration, washing, and drying were then performed, so that a white powder copolymer (B-1) was obtained.

Examples 1 to 3 and Comparative Examples 1 to 3

<Preparation of Resin Composition>

After 40 parts of the graft copolymer (A-1), 60 parts of the copolymer (B-1), 0.2 parts of ethylenebis(stearamide) ("AL-FLOW HSOS) manufactured by NOF Corp.), and as the alkaline earth metal oxide (M), magnesium oxide (MgO "Kyowamag 150" manufactured by Kyowa Chemical Industry Co., Ltd.) in an amount shown in Table 1 were weighed, blending was performed using a Henschel mixer.

This mixture was melted/kneaded and extruded at a cylinder temperature of 210° C. using a single screw extruder having a screw diameter of 40 mm, so that pellets were formed.

By the use of the pellets of the resin composition thus obtained, the following tests were performed, and the results are shown in Table 1.

<Gas Generation/Adhesion Amount Test>

By the use of the pellets of the resin composition of each of the examples and the comparative examples, as shown in FIG. 1, injection molding was performed into a mold 10 so that after an injected molten resin flowed in two directions along runners 12 and 13 through a sprue 11, the two-direction flows were injected from side gates 14 and 15 and were brought into contact with each other in the mold to form a weld plane. In this case, a short shot was performed 100 times so that a melted resin 20 was placed in a non-welded state at the central portion in the mold 10 to form a gas trapping area instead of forming the weld plane. After the injection molding was completed, the amount of an oily deposit adhered to an exposed mold 10a portion at a non-welded portion was weighed as the gas adhesion amount. When the gas adhesion amount was less than 0.3 mg, since continuous molding could be performed without causing any problems, in the case in which the gas adhesion amount was less than 0.3 mg, the continuous moldability was ranked as "○", and in the case in which the gas adhesion amount was 0.3 mg or more, the continuous moldability was ranked as "×".

<High-Temperature Silver Test>

By the use of the pellets of the resin composition of each of the examples and the comparative examples, a dumbbell test piece used for ISO 178 Test was molded at a cylinder temperature of 310° C. or 320° C. using a molding machine (J85AD-110H manufactured by JSW Ltd.), and whether a silver streak was generated or not on the test piece thus obtained was judged by visual inspection.

○: No generation of silver streak
×: Generation of silver streak

TABLE 1

| | Comparative Example 1 | Example 1 | Example 2 | Example 3 | Comparative Example 2 | Comparative Example 3 |
|---|---|---|---|---|---|---|
| MgO addition amount (parts) | 0.01 | 0.1 | 0.2 | 0.3 | 0 | 0.5 |
| gas adhesion amount (mg) | 0.4 | 0.25 | 0.2 | 0.16 | 0.4 | 0.13 |
| high-temperature silver test (° C.) cylinder 310 | ○ | ○ | ○ | ○ | ○ | ○ |
| high-temperature silver test (° C.) cylinder 320 | ○ | ○ | ○ | ○ | ○ | × |
| continuous moldability | × | ○ | ○ | ○ | × | ○ |

As apparent from the results shown in Table 1, the thermoplastic resin composition of the present invention is excellent in continuous moldability and improvability of molded-article appearance.

On the other hand, Comparative Example 2 in which no magnesium oxide was contained and Comparative Example 1 in which the blending amount of magnesium oxide was excessively small were inferior in continuous moldability, and Comparative Example 3 in which the blending amount of magnesium oxide was excessively large was inferior in molded-article appearance.

Although the present invention has been described in detail with reference to the specific aspects, it is apparent to a person skilled in the art that the present invention may be variously changed without departing from the spirit and the scope of the present invention.

This application claims the benefit of Japanese Patent Application No. 2014-056706 filed Mar. 19, 2014, which is hereby incorporated by reference herein in its entirety.

REFERENCE SIGNS LIST 10 mold
11 sprue
12, 13 runner
14, 15 side gate
20 melted resin

The invention claimed is:

1. A thermoplastic resin composition comprising 18 to 44 parts by mass of a copolymer (A) and 56 to 82 parts by mass of a copolymer (B) so that the total thereof is 100 parts by mass, and further comprising 0.1 to 0.3 parts by mass of magnesium oxide with respect to 100 parts by mass of the total of the graft copolymer (A) and the copolymer (B), wherein the graft copolymer (A) is a graft copolymer obtained by graft copolymerization of 35 to 65 parts by mass of a monomer mixture (II) containing 60 to 95 percent by mass of an aromatic vinyl based monomer and 5 to 40 percent by mass of a vinyl cyanide based monomer in the presence of 35 to 65 parts by mass of a composite rubber polymer (I), the polymer (I) being composed of 5 to 90 percent by mass of a diene rubber (i) and 95 to 10 percent by mass of a cross-linked acrylic acid ester polymer (ii), the rubber (i) being obtained by using a small particulate diene rubber and an acid group-containing copolymer, the polymer (I) having a mass average particle diameter of 180 to 500 nm, and the total of the composite rubber polymer (I) and the monomer mixture (II) being 100 parts by mass; and the copolymer (B) is a copolymer obtained by polymerization of a monomer mixture containing 60 to 95 percent by mass of an aromatic vinyl based monomer and 5 to 40 percent by mass of a vinyl cyanide based monomer.

2. The thermoplastic resin composition according to claim 1, wherein the composite rubber polymer (I) is a polymer obtained by polymerization of a monomer including an acrylic acid ester in the presence of the diene rubber (i), the acrylic acid ester forming the cross-linked acrylic acid ester polymer (ii).

3. The thermoplastic resin composition according to claim 1, wherein a toluene soluble component of the diene rubber (i) has a polystyrene-based mass average molecular weight of 100,000 or more.

4. A resin molded article formed by molding the thermoplastic resin composition according to claim 1.

* * * * *